United States Patent
Ogunade

(10) Patent No.: US 11,702,310 B1
(45) Date of Patent: Jul. 18, 2023

(54) TRANSFERRABLE TAPE CARRIER

(71) Applicant: Christina O. Ogunade, Pacoima, CA (US)

(72) Inventor: Christina O. Ogunade, Pacoima, CA (US)

(*) Notice: Subject to any disclaimer, the term of this patent is extended or adjusted under 35 U.S.C. 154(b) by 261 days.

(21) Appl. No.: 17/177,616

(22) Filed: Feb. 17, 2021

(51) Int. Cl.
  *B29C 65/00* (2006.01)
  *B65H 35/00* (2006.01)
  *B29C 65/48* (2006.01)

(52) U.S. Cl.
  CPC ........ *B65H 35/0033* (2013.01); *B65H 35/008* (2013.01); *B29C 65/48* (2013.01)

(58) Field of Classification Search
  CPC .................. B29C 65/48; B65H 35/0033
  See application file for complete search history.

(56) References Cited

U.S. PATENT DOCUMENTS

| | | | | |
|---|---|---|---|---|
| 2,309,093 A * | 1/1943 | Borden | ............. | B65H 35/0046 225/6 |
| 2,487,351 A * | 11/1949 | Marsh | ................ | B65H 35/0053 118/235 |
| 2,566,733 A * | 9/1951 | Krueger | ............. | B65H 35/0066 225/24 |
| 2,581,190 A * | 1/1952 | Hodges | ................ | B65H 35/002 225/6 |
| 3,025,014 A * | 3/1962 | Casey | ................ | B65H 35/0026 242/598.5 |
| 3,120,461 A * | 2/1964 | Harbour | ............... | B65H 35/004 156/554 |
| 3,830,195 A * | 8/1974 | Burleson | ............. | A61B 5/1172 118/31.5 |
| 3,860,191 A * | 1/1975 | Geri | ...................... | B65C 9/1865 242/588 |
| 3,997,125 A * | 12/1976 | Sato | ........................ | B65C 11/02 242/613.5 |
| 4,253,905 A | 3/1981 | Regan | | |
| 4,648,538 A * | 3/1987 | Lien | ................... | B65H 35/0026 225/78 |
| 5,351,869 A * | 10/1994 | Ridenour | ........... | B65H 35/0026 225/78 |
| 6,302,177 B1 | 10/2001 | Gruber | | |
| 6,681,830 B1 | 1/2004 | Vulpitta et al. | | |
| 6,719,180 B2 | 4/2004 | Shah | | |
| 7,032,775 B1 | 4/2006 | Almeer et al. | | |
| 7,069,971 B1 | 7/2006 | Sheng | | |
| 9,382,092 B2 | 7/2016 | Johnson et al. | | |
| 9,725,273 B2 | 8/2017 | Gallegos | | |
| 9,834,401 B2 | 12/2017 | Johnson et al. | | |
| 10,549,942 B2 | 2/2020 | Le Rigoleur | | |
| 2003/0116284 A1 * | 6/2003 | Downs | ................ | B65H 37/005 156/579 |

\* cited by examiner

*Primary Examiner* — Philip C Tucker
*Assistant Examiner* — Nickolas R Harm
(74) *Attorney, Agent, or Firm* — Cramer Patent & Design, PLLC; Aaron R. Cramer

(57) ABSTRACT

A transferrable tape carrier comprises a tape reel and two housings. The first housing is configured to be a traditional handheld packaging tape dispenser while the second housing is configured to be a traditional desktop tape dispenser. The tape reel is configured to removably interact with either the handheld packaging tape dispenser or the desktop tape dispenser.

20 Claims, 7 Drawing Sheets

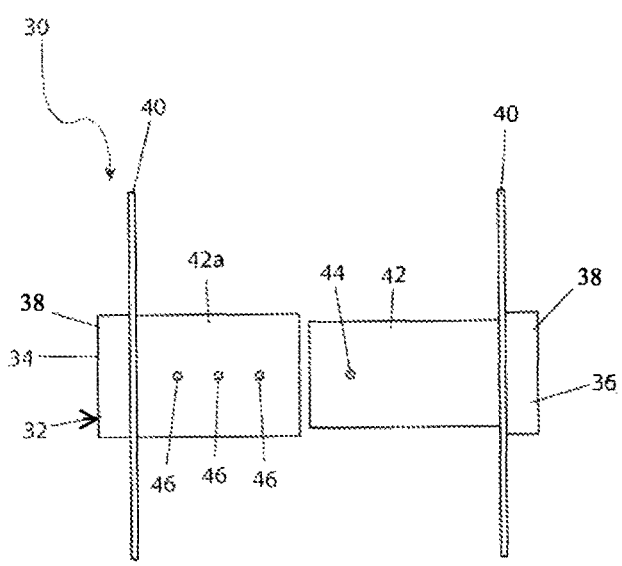
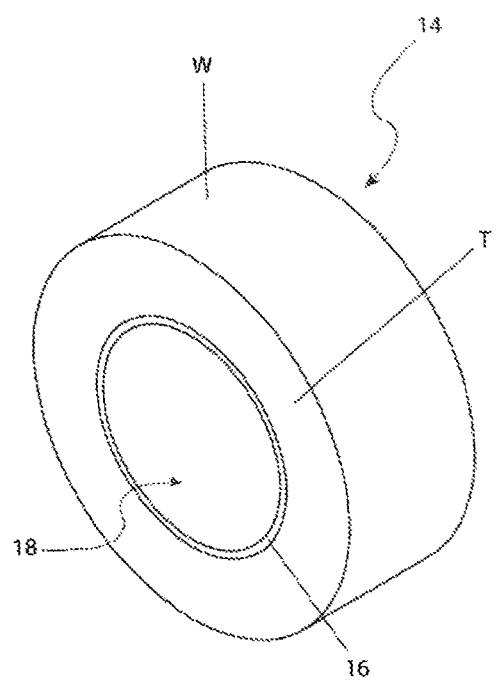
FIG. 7
FIG. 8

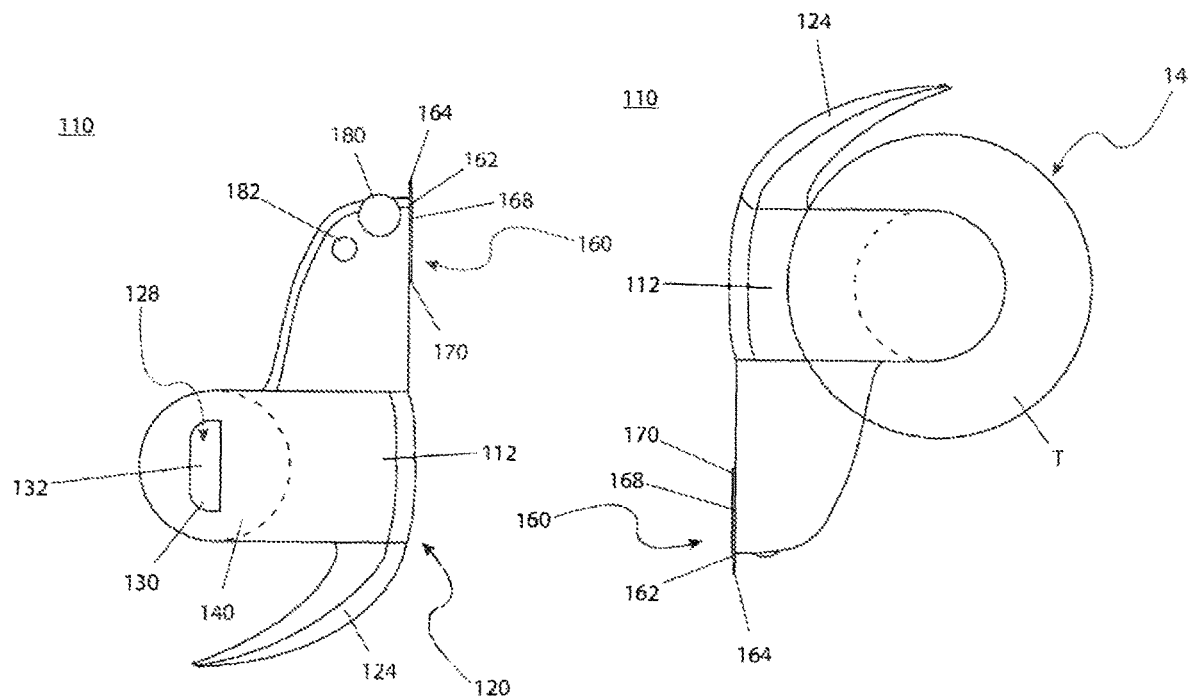

TRANSFERRABLE TAPE CARRIER

RELATED APPLICATIONS

None.

FIELD OF THE INVENTION

The presently disclosed subject matter is directed to a tape carrier that is also transferrable.

BACKGROUND OF THE INVENTION

Packaging tape is commonly used all over the world to not only close and seal packages, but hold items together, attach shipping labels, and seal plastic in an airtight manner. Due to its wide variety of uses, there are many different types of dispensers, with the hand-held version perhaps being the most common. The handheld version allows a user to seal a box by simply running a line of tape across the opening. However, due to its portable nature, such hand-held versions are easily misplaced forcing workers to spend an inordinate amount of time looking for the device when needed.

Other applications often call for a just small pieces of tape that are best served by a desk or wall-mounted enclosure. This forces the user to purchase two different dispensers along with at least two rolls of tape. Accordingly, there exists a need for a means by which packaging tape can be easily dispensed in a manner that addresses the above situations. The development of the transferrable tape carrier will serve to meet these needs.

SUMMARY OF THE INVENTION

The principles of the present invention provide for a tape dispenser device has a housing which in turn has a base with a pair of telescoping extensions having a first telescoping extension and a second telescoping extension and a pair of holder bars which are configured for translation along the slide bar. The holder bars are adjustable to the width of the tape roll and are held by the pair of telescoping extensions. The housing is configured for disposal of a tape roll. The pair of telescoping extensions define a cavity configured for disposal of the tape roll and the tape roll includes a circular roll of tape wound around a core that includes a through hole.

The core may be a plastic core. The core may also be a cardboard roll core. The pair of telescoping extensions each may include a connection mechanism which may be configured for connection with a portion of a suspension bar. The one or more connection locks and the connection mechanism may connect the tape roll with the housing. The connection mechanism may be selected from the group consisting of a threaded connection, a friction fit connection, a pressure fit connection, an interlocking engagement connection, a mating engagement connection, a dovetail connection, one or more clips connections, one or more barbs connections, a tongue in groove connection, a threaded connection, or a magnetic and/or key/key slot connection.

The suspension bar may be configured for disposal with the through hole of the core and connection with the housing. The suspension bar may include a slide bar that may extend between a slide bar first end and a slide bar second end. The slide bar may include one or more connection locks which are disposed at the slide bar first end and the slide bar second end and may be configured for connection with the connection mechanism. The one or more connection locks and the connection mechanism may connect the tape roll with the housing.

The slide bar may include a cross-section configuration selected from the group consisting of an oval cross-section configuration, an oblong cross-section configuration, a triangular cross-section configuration, a square cross-section configuration, a polygonal cross-section configuration, an irregular cross-section configuration, a uniform cross-section configuration, a non-uniform cross-section configuration, a variable cross. The first telescoping extension may include a spring-loaded protrusion and the second telescoping extension may include one or more openings configured for disposal of the spring-loaded protrusion.

The one or more openings may be disposed at a plurality of predetermined positions along the second telescoping extension indicating a plurality of widths of the tape roll. The first telescoping extension may extend within the second telescoping extension such that translation of the first telescoping extension allows protrusion to slide within first telescoping extension to a desired opening to adjust a width between holder bars. A release button may be provided to facilitate removal of the tape roll. The base may include a releasable attachment having a serrated blade configured to cut a piece of tape from the tape roll. The base may include a plurality of weighted foot attachments configured to facilities stability on a surface.

Each of the pair of holder bars include a cross-section configuration selected from the group consisting of an oval cross-section configuration, an oblong cross-section configuration, a triangular cross-section configuration, a square cross-section configuration, a polygonal cross-section configuration, an irregular cross-section configuration, a uniform cross-section configuration, a non-uniform cross-section configuration, a variable cross-section configuration, a tubular cross-section configuration or a tapered cross-section configuration. The tape dispenser may also have a hand-held tape dispenser which has a hand-held housing may be configured for disposal of a tape a hand-held base with a handle extending therefrom. The hand-held base may include a first and roller and a second roller configured to facilitate applying the tape to a surface using the hand-held tape dispenser.

BRIEF DESCRIPTION OF THE DRAWINGS

These and other features, aspects, and advantages of the present disclosure will become better understood with regard to the following description, appended claims, and accompanying drawings where:

FIG. 7 is a side view of a component of a tape dispenser device, according to an embodiment of this disclosure;

FIG. 8 is a side view of a component of a tape dispenser device, according to an embodiment of this disclosure;

FIG. 12 is a side view, part cross section, of a tape dispenser device, according to an embodiment of this disclosure; and, FIG. 13 is a side view of a tape dispenser device, according to an embodiment of this disclosure.

Figure 1:
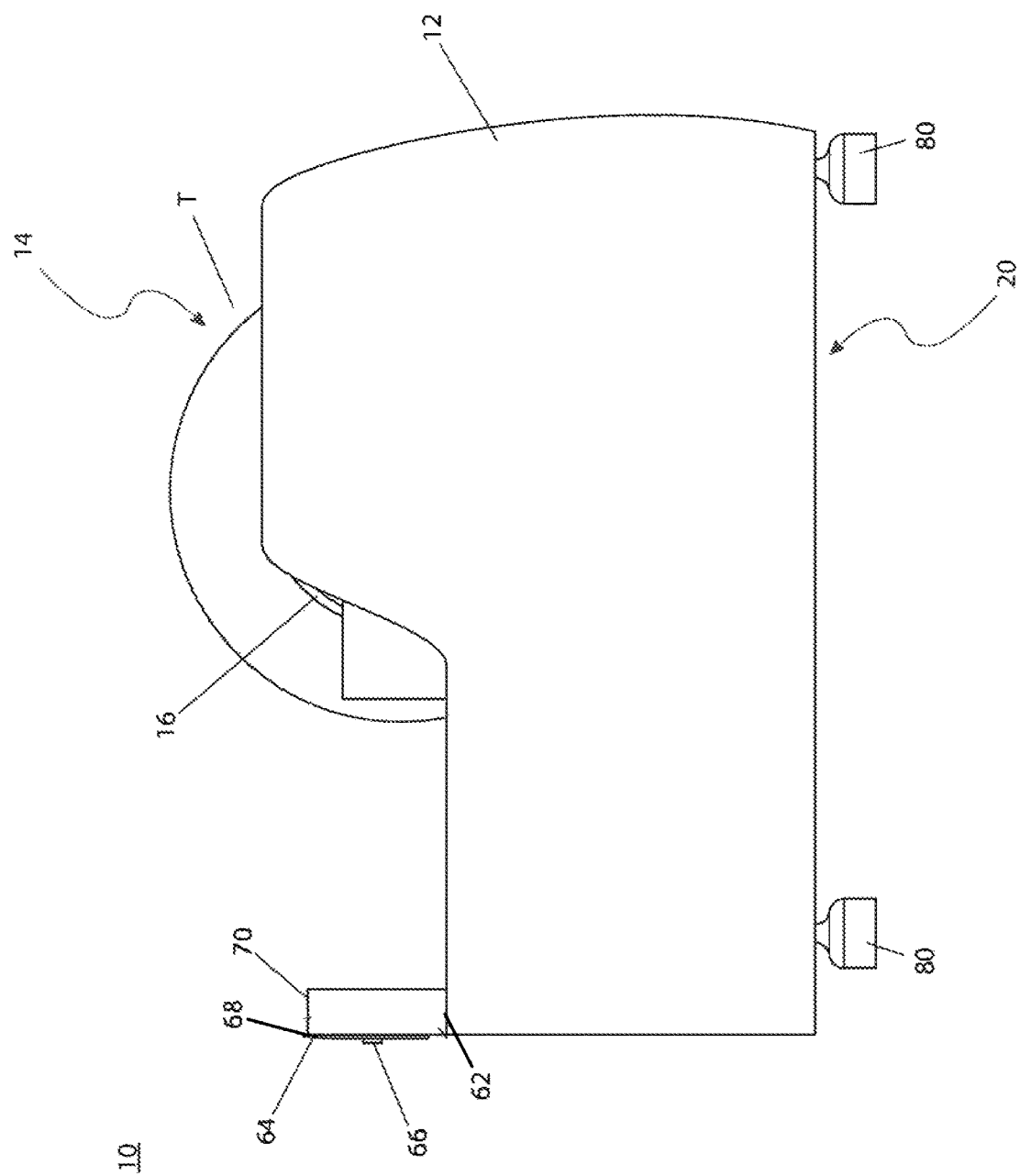
FIG. 1 is a side view of a tape dispenser device, according to an embodiment of this disclosure.
Figure 2:
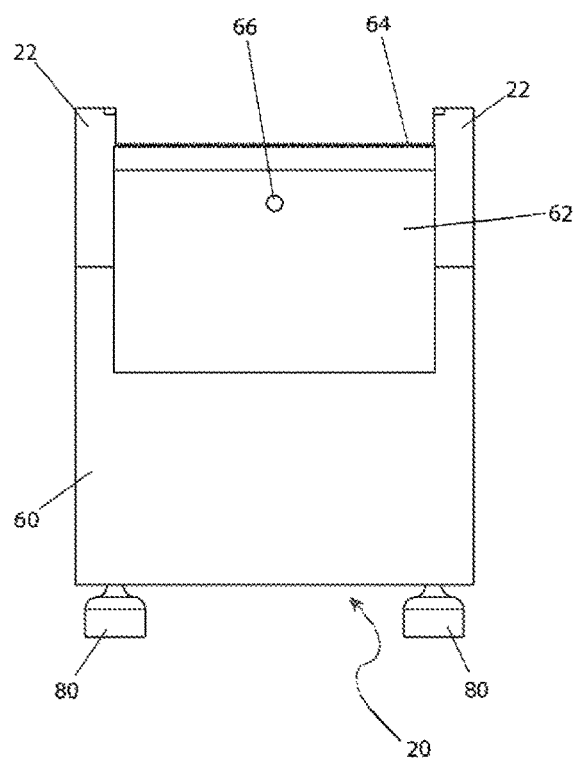
FIG. 2 is a front view of a tape dispenser device, according to an embodiment of this disclosure.
Figure 3:
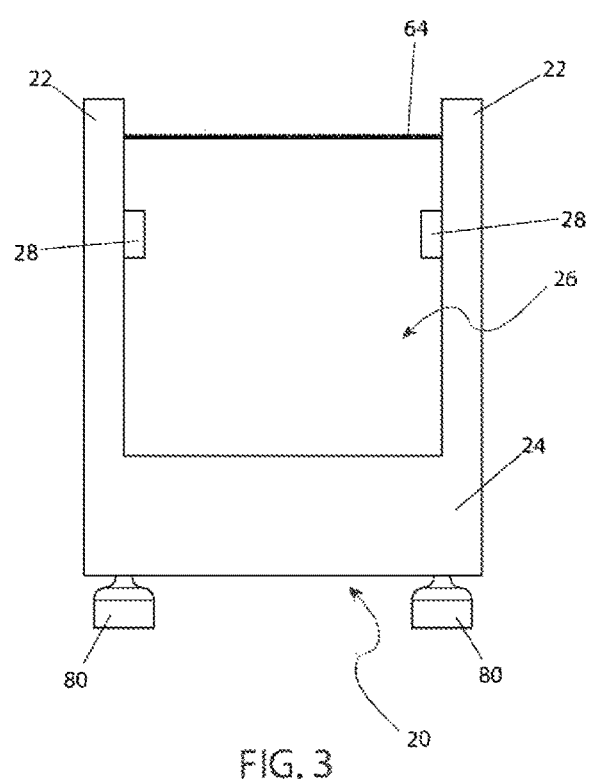
FIG. 3 is a back view of a tape dispenser device, according to an embodiment of this disclosure.
Figure 4:
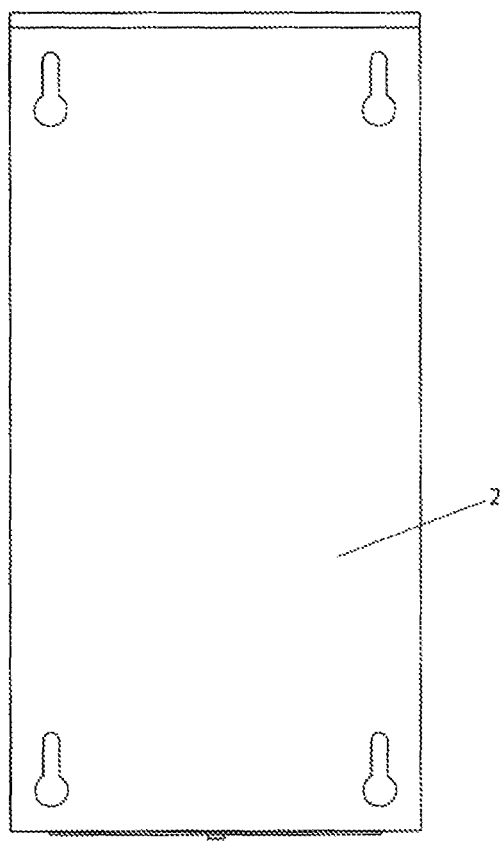
FIG. 4 is a bottom view of a tape dispenser device, according to an embodiment of this disclosure.
Figure 5:
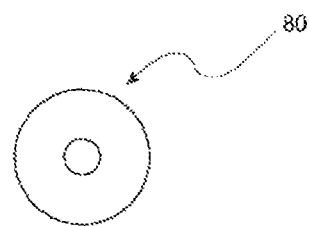
FIG. 5 is a top view of a component of a tape dispenser device, according to an embodiment of this disclosure.
Figure 6:
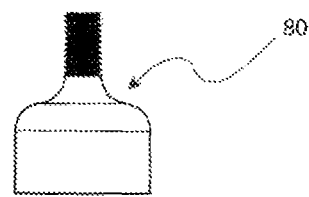
FIG. 6 is a side view of a component of a tape dispenser device, according to an embodiment of this disclosure.
Figure 9:
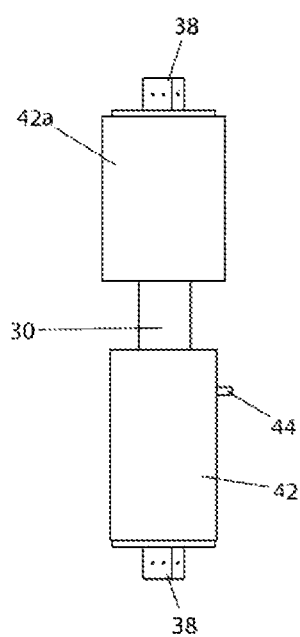
FIG. 9 is a side view of a components of a tape dispenser device, according to an embodiment of this disclosure.
Figure 10:
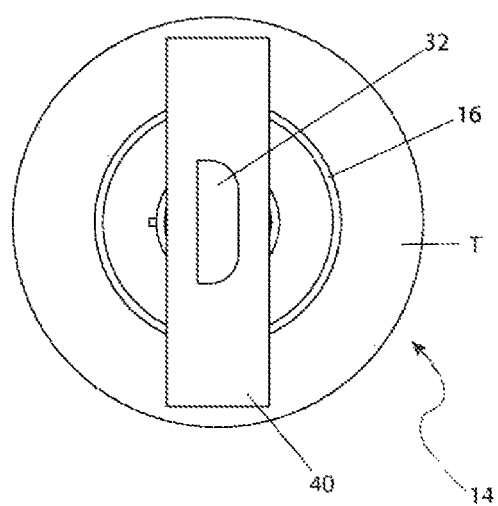
FIG. 10 is a side view of a component of a tape dispenser device, according to an embodiment of this disclosure.

DESCRIPTIVE KEY
10 tape dispenser device
12 housing
14 tape roll
16 core
18 through hole
20 base
22 extension
24 base first end
26 cavity
28 connection mechanism
30 suspension bar
32 slide bar
34 slide bar first end
36 slide bar second end
38 lock
40 holder bar
42 first telescoping extension
42a second telescoping extension
44 protrusion
46 opening
60 base second end
62 attachment
64 blade
66 screw
68 flange
70 first surface
80 foot attachment
110 hand-held tape dispenser
112 hand-held housing
120 hand-held base
124 handle
128 hand-held connection mechanism
130 hand-held suspension bar
140 hand-held bolder bar
160 hand-held base end
162 hand-held attachment
164 hand-held blade
168 hand-held flange
170 second surface
180 first roller
182 second roller
T tape
W width

DETAILED DESCRIPTION

The following disclosure is provided to describe various embodiments of an tape dispenser device. Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. In the following disclosure, a tape holding and dispensing device 10 will be discussed. The tape holding and dispensing device 10 of the present disclosure is configured to be adjustable to a width W of the tape roll 14 to be dispensed. Tape holding and dispensing device 10 can be placed on a desk, mounted to a wall or be provided as a hand-held device 110 for manual use. Skilled readers should not view the inclusion of any alternative labels as limiting in any way.

Referring now to FIGS. 1-11, an illustrative tape dispenser device 10 will now be discussed in more detail. Tape dispenser 10 includes a housing 12. Housing 12 is configured for disposal of a tape roll 14, as described herein. Tape roll 14 typically includes a circular roll of tape T wound around a plastic or cardboard roll core 16. Core 16 includes a through hole 18. Tape roll 14 can be provided in differing widths W, as needed for various applications.

Housing 12 includes a base 20. Base 20 includes extensions 22 positioned at a base first end 24. In some embodiments, extensions 22 include a height of approximately six inches (6.0 in.). In some embodiments, base 20 includes a length of approximately ten inches (10.0 in.). Extensions 22 define a cavity 26 configured for disposal of tape roll 14. Extensions 22 each include a connection mechanism 28 configured for connection with a portion of a suspension bar 30, as described herein. In some embodiments, connection mechanism 28 is configured for engagement with suspension bar 30 via a threaded connection, friction fit, pressure fit, interlocking engagement, mating engagement, dovetail connection, clips, barbs, tongue in groove, threaded, magnetic and/or key/key slot.

Suspension bar 30 is configured for disposal with through hole 18 of core 16 and connection with housing 12, as described herein. Suspension bar 30 includes a slide bar 32 that extends between a slide bar first end 34 and a slide bar second end 36. In some embodiments, slide bar 32 may have various cross-section configurations, such as, for example: oval, oblong, triangular, square, polygonal, irregular, uniform, non-uniform, variable, tubular and/or tapered. Slide bar 32 includes connection locks 38 disposed at slide bar first and second ends 34, 36 and configured for connection with connection mechanism 28, as described herein. Engagement of locks 38 with connection mechanism 28 connects tape roll 14 with housing 12.

Housing 12 includes at least one (1) holder bar 40 configured for translation along slide bar 32. In some embodiments, holder bar 40 includes a thickness of approximately two millimeters (2.0 mm), a length of approximately four and one-half inches (4.5 in.) and a width of approximately one and one-quarter inches (1.25 in.). Holder bar 40 is adjustable to the width W of tape roll 14. Holder bar 40 is substantially rectangular. In some embodiments, holder bar 40 may have various cross-section configurations, such as, for example: oval, oblong, triangular, square, polygonal, irregular, uniform, non-uniform, variable, tubular and/or tapered. As shown, dispenser 10 includes two (2) holder bars 40 connected by first and second telescoping extensions 42, 42a configured for relative translation. First telescoping extension 42 includes a spring-loaded protrusion 44. Second telescoping extension 42a includes stops, for example, openings 46 configured for disposal of protrusion 44. Openings 46 are disposed at set positions along second telescoping extension 42a indicating various widths W of tape roll 14. In some embodiments, openings 46 are separated in one-half inch (0.5 in.) increments. In some embodiments, first telescoping extension 42 includes a diameter in a range of one to three inches (1.0-3.0 in.). In some embodiments, second telescoping extension 42a includes a diameter in a range of one to five inches (1.0-5.0 in.).

Figure 11:
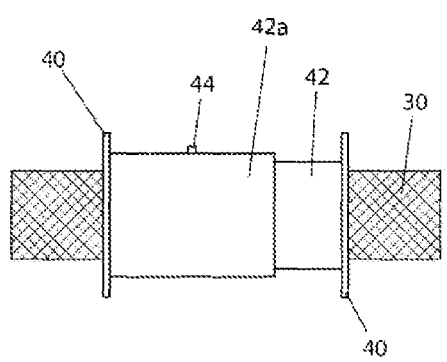
FIG. 11 is a side view of a component of a tape dispenser device, according to an embodiment of this disclosure.

In use, first telescoping extension 42 extends within second telescoping extension 42a, such that translation of the first telescoping extension 42 allows protrusion 44 to slide within first telescoping extension 42 to a desired opening 46 to adjust a width between holder bars 40, as shown in FIG. 11. In some embodiments, a release button is provided to facilitate removal of tape roll 14.

Base 20 includes a base second end 60. In some embodiments, base second end 60 includes a height of approximately four inches (4.0 in.). Base second end 60 includes an attachment 62 having a serrated blade 64. Blade 64 is configured to cut a piece from tape roll 14. Blade 64 is oriented a distance from base 20. In some embodiments, blade 64 is oriented one and one-half inches (1.5 in.) from a top surface of base 20. Blade 64 is releasably attached with base 20 by, for example, a screw 66. This allows blade 64 to be replaced as needed. In some embodiments, blade 64 is made of non-corrosive stainless steel.

Attachment 62 includes a flange 68 oriented towards tape roll 14. Flange 68 includes a surface 70 oriented for disposal of a sticky side of the tape T. First surface 70 allows for tape T to be attached and grabbed easily for use.

Base 20 includes weighted foot attachments 80 configured to facilities stability on a table surface. In some embodiments, attachments 80 are connected with base with a screw connection. In some embodiments, attachments 80 are configured for engagement with base 20 via a friction fit, pressure fit, interlocking engagement, mating engagement, dovetail connection, clips, barbs, tongue in groove, threaded, magnetic and/or key/key slot. In some embodiments, tape dispenser device 10 is configured for mounting to a wall.

In operation, tape roll 14 is translated along slide bar 30, holder bars 40 are translated along slide bar 30 for adjustment to the width W of tape roll 14. Locks 38 are engaged with connection mechanism 28 to connect tape roll 14 with housing 12.

In one embodiment, as shown in FIGS. 12 and 13, an illustrative hand-held tape dispenser device 110 will now be discussed in more detail. Hand-held tape dispenser 110 includes a hand-held housing 112. Hand-held housing 112 is configured for disposal of a tape roll 14, similar to tape roll 14 as described herein.

Hand-held housing 112 includes a hand-held base 120 with a handle 124 extending therefrom. In some embodiments, hand-held base 120 includes a width of approximately two and three-quarters inches (2.75 in.) In some embodiments, handle 124 is arcuate and is approximately three and one-half inches (3.5 in.) in length. Hand-held housing 112 includes a hand-held connection mechanism 128, similar to connection mechanism 28, as described herein, configured for connection with a portion of a hand-held suspension bar 130, as described herein. Hand-held suspension bar 130 includes at least one (1) hand-held holder bar 140 configured for translation along a hand-held slide bar 132 to adjust to a width W of tape roll 14, as described herein.

Hand-held base 120 includes a hand-held base end 160. Hand-held base 160 includes a hand-held attachment 162 that having a replaceable serrated hand-held blade 164. Hand-held blade 164 is configured to cut a piece from tape roll 14. Hand-held blade 164 is oriented a distance from hand-held base 120. Hand-held attachment 162 includes a hand-held flange 168 oriented towards tape roll 14. Hand-held flange 168 includes a second surface 170 oriented for disposal of a sticky side of the tape T, as described herein.

Hand-held base 120 includes first and second rollers 180, 182 configured to facilitate applying tape T to a surface using hand-held tape dispenser 110. First roller 180 is disposed on one (1) side of hand-held base 120 and second roller 182 is disposed on an opposite side of hand-held base 120. First and second rollers 180, 182 extend inward for contact with tape T. Rollers 180, 182 are positioned distal to blade 164. First roller 180 is positioned approximately one-half inch (0.5 in.) from hand-held blade 164 and second roller 182 is positioned approximately three-quarters inch (0.75 in.) from first roller 180. First roller 180 includes a diameter of approximately seven-tenths inch (0.7 in.). Second roller 182 includes a diameter of approximately one-half inch (0.5 in.). First roller 180 is larger and made of a softer material than second roller 182. For example, first roller 180 is made of rubber and second roller 182 is made of plastic or metal.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

The invention claimed is:

1. A tape dispenser device, comprising:
    a housing having a base with a pair of extensions having a first extension and a second extension, the housing is configured for disposal of a tape roll, the pair of extensions define a cavity configured for disposal of the tape roll and the tape roll includes a circular roll of tape wound around a core that includes a through hole; and
    a pair of holder bars configured for translation along a slide bar, the holder bars are adjustable to the width of the tape roll and are held by the pair of extensions.

2. The tape dispenser device, according to claim 1, wherein the core is a plastic core.

3. The tape dispenser device, according to claim 1, wherein the core is a cardboard roll core.

4. The tape dispenser device, according to claim 1, wherein the pair of extensions each include a connection mechanism configured for connection with a portion of a suspension bar.

5. The tape dispenser device, according to claim 4, wherein one or more connection locks and the connection mechanism connects the tape roll with the housing.

6. The tape dispenser device, according to claim 4, wherein the connection mechanism is selected from the group consisting of a threaded connection, a friction fit connection, a pressure fit connection, an interlocking engagement connection, a mating engagement connection, a dovetail connection, one or more clips connections, one or more barbs connections, a tongue in groove connection, a threaded connection, or a magnetic and/or key/key slot connection.

7. The tape dispenser device, according to claim 4, wherein the suspension bar is configured for disposal with the through hole of the core and connection with the housing.

8. The tape dispenser device, according to claim 4, wherein the suspension bar includes the slide bar that extends between a slide bar first end and a slide bar second end.

9. The tape dispenser device, according to claim 8, wherein the slide bar includes one or more connection locks disposed at the slide bar first end and the slide bar second end and are configured for connection with the connection mechanism.

10. The tape dispenser device, according to claim 9, wherein the one or more connection locks and the connection mechanism connects the tape roll with the housing.

11. The tape dispenser device, according to claim 9, wherein the slide bar includes a cross-section configuration selected from the group consisting of an oval cross-section configuration, an oblong cross-section configuration, a triangular cross-section configuration, a square cross-section configuration, a polygonal cross-section configuration, an irregular cross-section configuration, a uniform cross-section configuration, a non-uniform cross-section configuration, a variable cross-section configuration, a tubular cross-section configuration, or a tapered cross-section configuration.

12. The tape dispenser device, according to claim 1, wherein a first telescoping extension includes a spring-loaded protrusion and a second telescoping extension includes one or more openings configured for disposal of the spring-loaded protrusion.

13. The tape dispenser device, according to claim 12, wherein the one or more openings are disposed at a plurality of predetermined positions along the second telescoping extension indicating a plurality of widths of the tape roll.

14. The tape dispenser device, according to Claim 12, wherein the first telescoping extension extends within the second telescoping extension such that translation of the first telescoping extension allows a protrusion to slide within the second telescoping extension to a desired opening to adjust a width between holder bars.

15. The tape dispenser device, according to claim 14, further comprising a release button is provided to facilitate removal of the tape roll.

16. The tape dispenser device, according to claim 1, wherein the base includes a releasable attachment having a serrated blade configured to cut a piece of tape from the tape roll.

17. The tape dispenser device, according to claim 1, wherein the base includes a plurality of weighted foot attachments configured to facilitate stability on a surface.

18. The tape dispenser device, according to claim 1, wherein each of the pair of holder bars include a cross-section configuration selected from the group consisting of an oval cross-section configuration, an oblong cross-section configuration, a triangular cross-section configuration, a square cross-section configuration, a polygonal cross-section configuration, an irregular cross-section configuration, a uniform cross-section configuration, a non-uniform cross-section configuration, a variable cross-section configuration, a tubular cross-section configuration or a tapered cross-section configuration.

19. The tape dispenser device, according to claim 1, further comprising a hand-held tape dispenser having a hand-held housing that is configured for disposal of the tape, and a hand-held base with a handle extending therefrom.

20. The tape dispenser device, according to claim 19, wherein the hand-held base includes a first roller and a second roller configured to facilitate applying the tape to a surface using the hand-held tape dispenser.

\* \* \* \* \*